United States Patent Office 3,152,153
Patented Oct. 6, 1964

3,152,153
2-METHYLENETESTOSTERONE DERIVATIVES
David Eurof Evans, Virginia Water, Surrey, and Peter John Palmer, Whitton, England, assignors to Parke, Davis & Company, Detroit, Mich., a corporation of Michigan
No Drawing. Filed Jan. 15, 1962, Ser. No. 166,416
Claims priority, application Great Britain Jan. 13, 1961
6 Claims. (Cl. 260—397.4)

The present invention is concerned with novel steroid compounds and with methods for the production of such compounds. More particularly, this invention relates to 2-methylene steroids which can be represented by the following formula

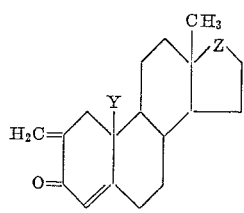

wherein Y represents hydrogen or methyl and Z represents a hydroxymethylene, lower alkanoyloxymethylene, lower alkyl substituted hydroxymethylene, carbonyl, or ethynyl substituted hydroxymethylene, $C(C{\equiv}CH)OH$, group. The hydroxyl or esterified hydroxyl group when present at position 17 has a beta configuration.

In accordance with the invention 2-methylene steroids of the above formula wherein Z represents hydroxymethylene, lower alkyl substituted hydroxymethylene or ethynyl substituted hydroxymethylene can be produced by converting the alkoxyoxalyl group in a compound having the formula

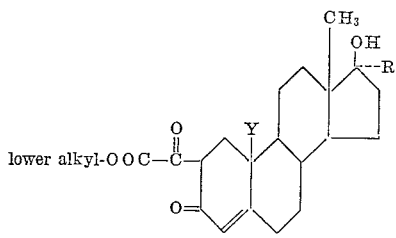

wherein R is hydrogen, lower alkyl or ethynyl, and Y is as defined before; or the corresponding enolic formula, to a methylene group. This conversion can be most conveniently carried out by reacting the aforesaid compound with formaldehyde. Formaldehyde per se may be used or it may be created in situ from a polymeric form of formaldehyde such as para-formaldehyde. Preferably an aqueous solution of formaldehyde is used. The reaction with the formaldehyde is carried out in the presence of a basic catalyst such as an alkali metal carbonate or alkaline earth metal carbonate and in a solvent such as a lower boiling alcohol like methanol, ethanol, isopropyl alcohol, or other water miscible solvents or mixtures of such solvents with water. A mixture of methanol and water is the preferred solvent medium. The relative proportions of the reactants may be varied widely but for best results at least one and preferably from thirty to fifty equivalents of formaldehyde should be employed for each equivalent of alkoxyoxalyl steroid. The temperature of the reaction may be varied from 15° C. to 100° C. The reaction is usually carried out either at room temperature or at the reflux temperature of the reaction mixture.

The alkoxyoxalyl steroids employed in the practice of this invention can be produced by condensing the parent steroids unsubstituted at position 2 with an excess of a dialkyl oxalate. Diethyl oxalate is a preferred reactant.

The compounds of the invention wherein Z is an alkanoyloxymethylene group can be prepared by acylation of the 17-hydroxyl group of a steroid of the formula

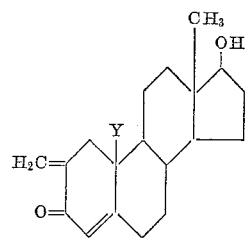

where Y is as defined before. This is accomplished by reacting the 17-hydroxy steroid compound with a lower alkanoic acid or a reactive derivative thereof. Some examples of useful acylating agents are acetic anhydride, acetyl chloride, propionyl chloride, propionic anhydride, and butyryl bromide. For best results, at least one equivalent and preferably an excess of the acylating agent is employed for each equivalent of the hydroxy compound. Typically, the acylating agent serves as solvent for the reaction although inert solvents such as ether, benzene, and the like may also be employed. If desired, acylation of the hydroxy compounds can be carried out in the presence of a base such as triethylamine or pyridine. Conveniently, the acylation is carried out at a temperature in the range of from 0–120° C. However, the temperature of the reaction is not particularly critical and temperatures both above and below those set forth are acceptable. The preferred temperature range is 0 to 40° C.

The compounds of the invention wherein Z is a carbonyl group can be produced by oxidizing the 17-hydroxyl group of a steroid of formula

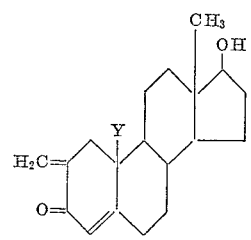

where Y is as defined before, to a ketone group. The oxidation is brought about by the action of oxidizing agents capable of transforming a secondary alcohol group into a keto group. Particularly useful as an oxidizing agent for this reaction is chromium trioxide. The relative proportions of the reactants may be varied widely but it is preferable to employ a slight excess of the oxidizing agent. When one uses chromium trioxide, any excess oxidizing agent can be destroyed by the addition of methanol to the reaction mixture after the oxidation is complete. Among the various inert solvents suitable for the reaction, acetone is preferred. Temperatures in the range of from 0° to 100° C. are satisfactory and preferably the reaction is carried out between 0° and 56° C.

The products of the invention have useful pharmacological properties. They are anabolic agents exhibiting low androgenic activity. They are pituitary inhibitors and they are also hypocholesteremic agents which cause a fall in blood cholesterol without producing the estrogenic effects normally encountered in the use of such agents. Preferred compounds with respect to anabolic activity are 2-methylenetestosterone, 2-methylene-17α-methyltestosterone, 2-methylene-19-nortestosterone, 2-methylene-17α-methyl-19-nortestosterone, and 2-methylene-17α-ethyl-19-nortestosterone. Preferred compounds with respect to pituitary inhibition are 2-methyleneandrost-4-ene-3,17-dione, 2-methylene-17α-methyltestosterone, 2-methylene-17α-methyl-19-nortestosterone, and 2-methylene-17α-ethynyl-19-nortestosterone. A preferred compound with respect to hypocholesteremic activity is 2-methylenetestosterone. The compounds of the invention are effective upon either oral or parenteral administration.

The following examples illustrate the invention.

Example 1

A stirred solution of 28.9 g. of 2-ethoxyoxalyltestosterone in 800 ml. methanol and 280 ml. 36% formalin solution is treated dropwise over a two hour period with a solution of 28.0 g. potassium carbonate in 250 ml. water. During the period of addition, water (400 ml. water) is added as required to prevent precipitation of the potassium carbonate. Stirring is continued for ninety minutes. The reaction mixture is then diluted with water and extracted with methylene chloride. The methylene chloride extract is washed first with saturated sodium chloride solution, then with water, dried over anhydrous sodium sulfate and finally evaporated to give 2-methylenetestosterone as a yellow oil. The oil is dissolved in benzene and chromatographed over 400.0 g. of neutral alumina, activity II. The 2-methylenetestosterone is eluted with benzene, the eluate containing the desired 2-methylenetestosterone is evaporated to dryness and the residue purified by several recrystallizations from acetone; M.P. 160–162° C.

Example 2

A stirred solution of 5.2 g. of 2-ethoxyoxalyl-17α-methyltestosterone in 150 ml. methanol is treated dropwise with 52 ml. 36% formalin solution. The mixture is stirred for thirty minutes and then a solution of 5.2 g. potassium carbonate in 80 ml. water is added dropwise over a sixty minute period. Stirring is continued for a further ninety minutes, the reaction mixture diluted with water, and extracted with methylene chloride. The methylene chloride extract is washed neutral with water, dried, and evaporated in vacuo below 40° C. to give 2-methylene-17α-methyltestosterone as a yellow oil. The oil is dissolved in benzene and chromatographed on 150.0 g. of alumina (Spence type "H" alumina which has been deactivated with 5% of its weight of a 10% aqueous acetic acid solution). The 2-methylene-17α-methyltestosterone is eluted with benzene, the eluate evaporated to dryness and the residue recrystallized several times from acetone; M.P. 177–180° C.

Example 3

A stirred solution of 3.5 g. of 2-ethoxyoxalyl-17α-ethyltestosterone in 105 ml. methanol and 35 ml. 36% formalin solution is treated at room temperature with a solution of 5.0 g. potassium carbonate in 35 ml. water over a period of one hour. Stirring is continued for an additional two hours at room temperature, the reaction poured into water and the product extracted with methylene chloride. The extract is washed neutral with water, dried, and evaporated to dryness leaving a residue of 2-methylene-17α-ethyltestosterone. The residue is dissolved in benzene and chromatographed on 150.0 g. of alumina (Spence type "H" alumina which has been deactivated with 5% of its weight of a 10% acetic acid solution). The 2-methylene-17α-ethyltestosterone is eluted with benzene, the eluate evaporated to dryness and the residue recrystallized several times from aqueous acetone; M.P. 147–149° C. and 156–158° C.

The 2-ethoxyoxalyl-17α-ethyltestosterone used as a starting material can be prepared as follows: A stirred solution of 9.0 g. 17α-ethyltestosterone in 100 ml. anhydrous benzene is treated with 0.681 g. sodium hydride followed by 4.15 g. diethyl oxalate. The reaction mixture is stirred at room temperature for one hour and then at 50° C. for an additional hour. Stirring is then continued at room temperature for a further two hours. Dry ether (200 ml.) is added and the yellow solid is filtered, washed with ether, and dried in vacuo. The solid is suspended in water, the solution acidified with 2 N hydrochloric acid, and the ester extracted with ether. The ether is washed neutral with water, dried, and evaporated to dryness leaving 2-ethoxyoxalyl-17α-ethyltestosterone as a yellow semi-solid.

Example 4

A solution of 1.5 g. 2-methylenetestosterone in 20 ml. pyridine is treated with 10 ml. propionic anhydride. The reaction mixture is allowed to stand overnight at room temperature, poured on ice, acidified and extracted with ether. The ethereal extract is washed with water, saturated sodium carbonate, and finally washed neutral with water. Evaporation of the ethereal solution to dryness yields the desired 2-methylenetestosterone propionate. The 2-methylenetestosterone propionate is chromatographed on 100 g. of alumina (Spence type "H" alumina which has been deactivated with 5% of its weight of a 10% acetic acid solution). The 2-methylenetestosterone propionate is eluted with petroleum ether (40–60° C.)/benzene (1:1), the eluate evaporated to dryness and the residue crystallized from acetone; M.P. 153–156° C.

By the substitution of 1.5 g. of 2-methylene-19-nortestosterone in the foregoing procedure, the product obtained is 2-methylene-19-nortestosterone propionate. The corresponding acetic acid esters are obtained by the substitution of acetic anhydride for the propionic anhydride.

Example 5

A solution of 1.5 g. 2-methylenetestosterone in 200 ml. freshly distilled acetone is treated dropwise at 15° C. with 1.5 ml. of Jones' chromic acid reagent. The resulting reaction mixture is stirred for five minutes, methanol is added to destroy excess chromic acid and most of the solvent is removed in vacuo. The residue, upon treatment with water, gives 2-methyleneandrost-4-ene-3,17-dione as a white solid. This solid is then chromatographed on 100 g. of alumina (Spence type "H" alumina which has been deactivated with 5% of its weight of a 10% acetic acid solution). The 2-methyleneandrost-4-ene-3,17-dione is eluted with petroleum ether (40–60° C.)/benzene (1:1), the eluate evaporated to dryness and the residue purified by recrystallization from acetone; M.P. 195–198° C.

Example 6

Twenty ml. of 40% formalin solution is slowly added to a stirred solution of 2 g. of 2-ethoxyoxalyl-19-nortestosterone in 100 ml. of methanol in a nitrogen atmosphere. After 15 minutes a solution of 2 g. of potassium carbonate in 10 ml. of water is added dropwise over a 30 minute period. The reaction mixture is stirred for 90 minutes more, poured into saturated sodium chloride solution and the product is extracted with a mixture of ether and methylene chloride. The extract is washed with water and evaporated to yield about 1.6 g. of a yellow oil. This product in a minimum quantity of benzene is poured on a chromatography column containing 45 g. of alumina (Woelm neutral alumina, activity II). The desired product, 2-methylene-19-nortestosterone, is obtained by eluting the column with 1:1 benzene-methylene chloride; M.P. 124–126° C. after crystallizations from ether-petroleum ether.

The 2-ethoxyoxalyl-19-nortestosterone used as a starting material can be prepared as follows. A stirred solution of 5.48 g. of 19-nortestosterone in anhydrous benzene is treated at 20° C. under nitrogen with sodium methoxide solution (prepared from 0.506 g. of sodium and 10 ml. of methanol) and reacted with 2.98 ml. of diethyl oxalate over a period of 2½ hours. The reaction mixture is poured into 600 ml. of anhydrous ether and the insoluble yellow product is collected on a filter and dissolved in water. The aqueous solution is acidified and extracted with ether. The ether extract is washed with water and evaporated to yield 2-ethoxyoxalyl-19-nortestosterone.

Example 7

A stirred solution of 297 mg. of 2-methylene-19-nortestosterone in 30 ml. of acetone at 10–15° C. is treated with 0.3 ml. of Jones' chromic acid reagent (prepared from 26.72 g. of chromium trioxide and 23 ml. of concentrated sulfuric acid, diluted to 100 ml. with water) added over a 1 minute period. Stirring is continued for an additional 3 minutes and the reaction mixture is poured into water and extracted with ether. The ether extract is washed with water until neutral, dried, filtered and evaporated to give 2-methylene-19-norandrost-4-ene-3,17-dione; M.P. 134–137° C. after crystallizations from petroleum ether.

Example 8

Ten ml. of 40% formalin solution is added to a stirred solution of 2 g. of 2-ethoxyoxalyl-17α-methyl-19-nortestosterone in 100 ml. of methanol under nitrogen. After 15 minutes a solution of 2 g. of potassium carbonate in 5 ml. of water is added and stirring is continued for an additional hour. The reaction mixture is poured into saturated sodium chloride solution and extracted with ether and methylene chloride. The extracts are washed with water until neutral and evaporated to give about 1.56 g. of a yellow foam. This product in a minimum amount of benzene is poured onto a chromatography column containing 45 g. alumina (Woelm neutral alumina, activity III). The desired product, 2-methylene-17α-methyl-19-nortestosterone, is eluted from the column with benzene; M.P. 122–123° C. after crystallization from acetone-petroleum ether.

The 2-ethoxyoxalyl-17α-methyl-19-nortestosterone used as a starting material can be prepared as follows. A stirred solution of 5.2 g. of 17α-methyl-19-nortestosterone in 90 ml. of anhydrous benzene is treated under nitrogen for 3 hours with 3.4 ml. of diethyl oxalate and sodium methoxide solution (prepared from 0.46 g. of sodium and 10 ml. of methanol). Anhydrous ether is added and the insoluble brown solid is collected on a filter and dissolved in water. The aqueous solution is washed with benzene, acidified and the white solid product is extracted with ether. The ether extract is washed and evaporated to give a residue of 2-ethoxyalyl-17α-methyl-19-nortestosterone.

Example 9

One hundred twenty ml. of 40% formalin solution is added over a 10 minute period to a stirred solution of 12 g. of 2-ethoxyoxalyl-17α-ethyl-19-nortestosterone in 900 ml. of methanol under nitrogen. The mixture is stirred for an additional 20 minutes and then a solution of 12 g. of potassium carbonate in 240 ml. of water is added over a 30 minute period. Stirring is continued for 90 minutes more after which the mixture is diluted with saturated sodium chloride solution and extracted with methylene chloride-ether. The extract is washed with water until neutral, dried over magnesium sulfate, filtered and evaporated to give about 9 g. of a yellow oil. This oil is chromatographed on alumina (270 g. of neutral alumina, activity III). The column is prepared with 99:1 benzene-methanol and eluted with further quantities of this solvent to recover the product. If desired, the product can be rechromatographed and eluted with 1:1 petroleum ether-benzene. It is 2-methylene-17α-ethyl-19-nortestosterone, having an ultraviolet absorption maximum at 260 millimicrons in ethanol; infrared absorption maxima in paraffin oil at 3405, 1661, 1615, and 884 reciprocal centimeters; $[\alpha]_D^{25} = +18°$ (1.05% in chloroform).

The 2-ethoxyoxalyl-17α-ethyl-19-nortestosterone used as a starting material can be prepared as follows. A solution of 14.5 g. of 17α-ethyl-19-nortestosterone in 300 ml. of tertiary butanol is prepared by stirring and warming the mixture to 65° C. After cooling to 60° C. the stirred solution is treated under nitrogen with 13 ml. of diethyl oxalate and a solution of 1.65 g. of sodium in 32 ml. of methanol. The reaction mixture is stirred for 2 more hours and poured into a large volume of ether. The insoluble solid product (a sodium enolate) is collected on a filter, washed with ether and dissolved in water. The aqueous solution is washed with ether-methylene chloride, acidified with cold 4-normal hydrochloric acid and extracted with ether. The ether extract obtained in the last operation is washed with water until neutral, filtered and evaporated to give 2-ethoxyoxalyl-17α-ethyl-19-nortestosterone.

Example 10

Sixty-six ml. of 40% formalin solution is added during 30 minutes to a stirred solution of 6.8 g. of 2-ethoxyoxalyl-17α-ethynyl-19-nortestosterone in 220 ml. of methanol. A solution of 6.6 g. of potassium carbonate in 66 ml. of water is added to this mixture over a period of one hour and stirring is continued for an additional hour. The reaction mixture is poured into water, extracted with methylene chloride and the extract washed with water, dried and evaporated to give about 5.6 g. of a yellow foam. A chromatography column is prepared from 150 g. of alumina (Woelm neutral alumina, activity III) with 1:1 petroleum ether-benzene. The crude product in the same solvent mixture is poured onto this column and the desired 2-methylene-17α-ethynyl-19-nortestosterone is eluted with benzene; M.P. 123–124° C. after several crystallizations from acetone-petroleum ether or acetone-hexane.

The 2-ethoxyoxalyl-17α-ethynyl-19-nortestosterone used as a starting material can be prepared as follows. A solution is prepared by heating 9.8 g. of 17α-ethynyl-19-nortestosterone with 295 ml. of tertiary butanol and stirring at the boiling point until solution is complete. After cooling to 65° C., 8.9 ml. of diethyl oxalate and then a solution of 1.04 g. of sodium in 20 ml. of methanol is added. The reaction mixture is allowed to cool to room temperature, stirred for 2 more hours and poured into ether. The sodium enolate compound which is present is extracted with water and the aqueous extract is washed with ether, acidified and extracted with ether. The ether extract obtained in the last operation is washed with water, dried, filtered and evaporated to yield 2-ethoxyoxalyl-17α-ethynyl-19-nortestosterone; ultraviolet absorption maxima at 246 and 343 millimicrons in ethanol.

By the foregoing procedure, with the substitution of an equivalent amount of 2-ethoxyoxalyl-17α-ethynyltestosterone for the 2-ethoxyoxalyl-17α-ethynyl-19-nortestosterone, the product obtained is 2-methylene-17α-ethynyltestosterone; M.P. 180–184° C. The 2-ethoxyoxalyl-17α-ethynyltestosterone can be prepared by the reaction of 17α-ethynyltestosterone with diethyl oxalate in the general manner described.

We claim:
1. A compound of the formula

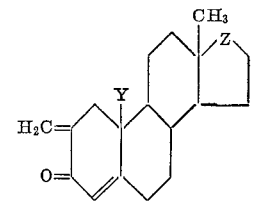

where Y is selected from the class consisting of hydrogen and methyl and Z is selected from the class consisting of β-hydroxymethylene, β-lower alkanoyloxymethylene, lower alkyl substituted β-hydroxymethylene, carbonyl, and ethynyl substituted β-hydroxymethylene.
2. 2-methylenetestosterone.
3. 2-methylene-17α-methyltestosterone.
4. 2-methylene-19-nortestosterone.
5. 2-methylene-17α-methyl-19-nortestosterone.
6. 2-methylene-17α-ethynyl-19-nortestosterone.

No references cited.